United States Patent Office 3,391,634
Patented July 9, 1968

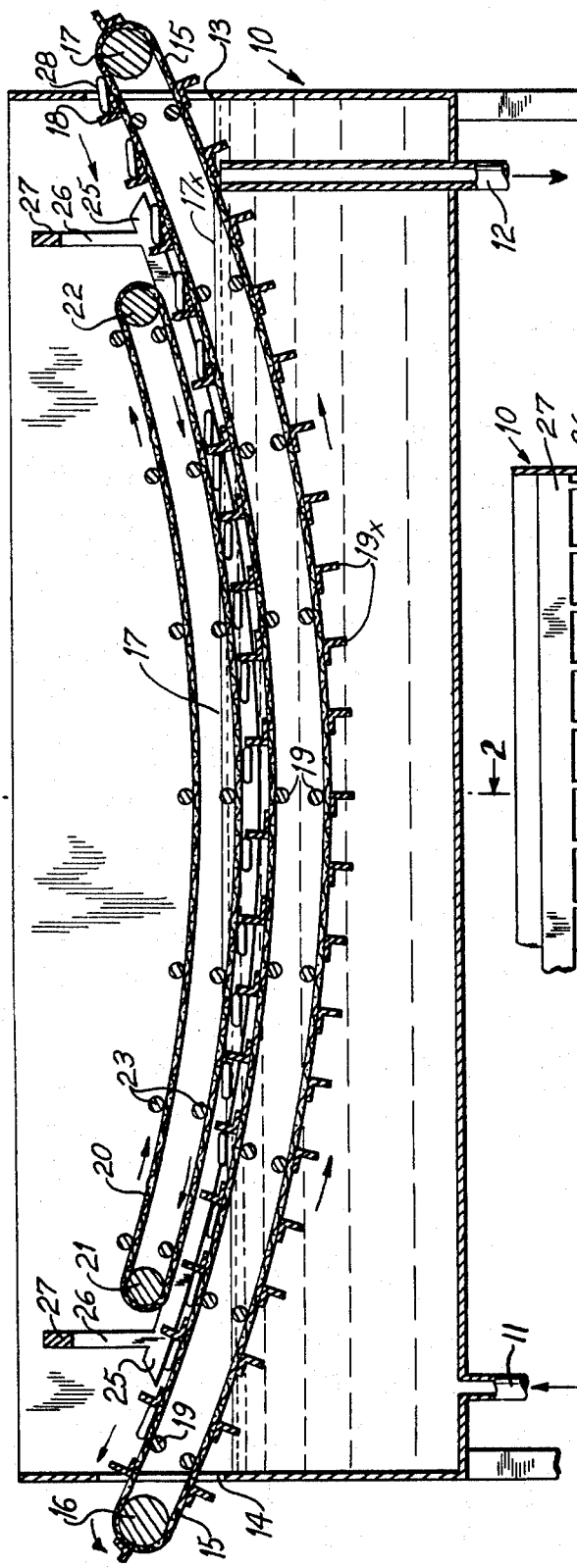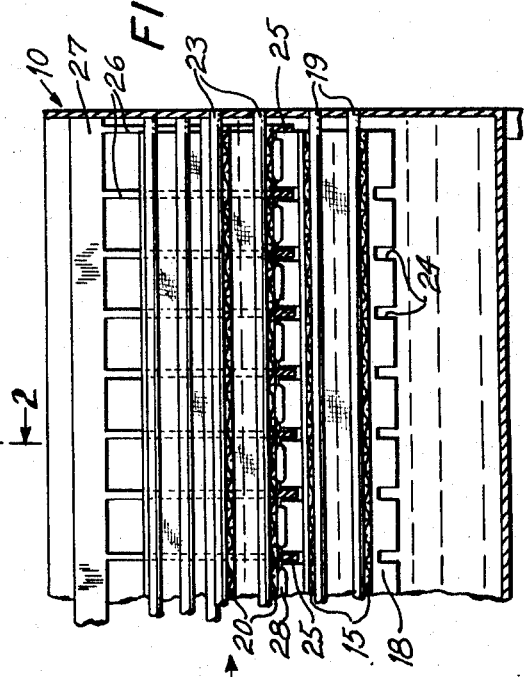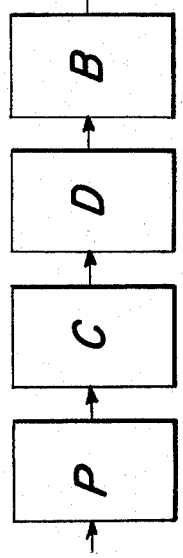

3,391,634
CAPTIVE BAGEL COOKER
Robert W. Williams, Brookville Road, Brookville, N.Y., and Robert Laurita, 3 Dolphin Lane, West Islip, N.Y. 11795
Filed July 18, 1966, Ser. No. 565,809
5 Claims. (Cl. 99—405)

ABSTRACT OF THE DISCLOSURE

Cooking apparatus for bagel-making having a bagel conveyor suspended in part in a tank of boiling water and having a plurality of transverse slats having spaced apart channels therein, a plurality of curved bars suspended in part in said boiling water and adapted to be disposed in said channels of said slats and a guide conveyor disposed over said bagel conveyor slats and suspended in part in said boiling water whereby said bagels are captively propelled through said boiling water.

---

This invention relates to an automatic cooker for bagels and the like and to an automatic process for making bagels.

Bagels are presently cooked by boiling a conditioned, or proofed bagel in boiling water for a few minutes in order to remove the surface starch of the bagel and thereby produce a baked bagel of glossy appearance and suitable edible qualities.

It is an object of this invention to provide a machine wherein bagels are cooked automatically and without human supervision.

It is another object to provide an automatic bagel cooker as one of a series of automatic units whereby all hand operation in the making of bagels is eliminated.

These and other objectives of this invention will become apparent upon reading the following descriptive disclosure taken in conjunction with the accompanying drawing in which:

FIG. 1 is a longitudinal section view of the device,
FIG. 2 is a transverse section view taken on line 2—2 of FIG. 1, and
FIG. 3 is a block diagram of the automatic process of this invention.

The preparation of preformed bagels in modern practice requires five steps, namely; (1) proofing or conditioning the bagel; (2) cooking or boiling the conditioned bagel; (3) drying the cooked bagel; (4) baking the suitably dry bagel and lastly (5) cooling the bagel before packaging.

All of the above five steps employed in the preparation of bagels are presently automatic or substantially automatic except for the boiling or cooking step.

Up to now the boiling of bagels have been a hand operation done by sliding a plurality of bagels into a kettle of boiling water, cooking them a sufficient number of minutes and then manually removing them with sieves to be then manually placed onto the moving belt of the dryer unit.

According to this invention the bagels are (1) conditioned on a moving belt in a conditioning cabinet then, (2) deposited on the moving belt of a cooker and sent through the boiling water of the cooker to be (3) deposited on the moving screen of a dryer and then after drying to be flipped over and (4) deposited onto the moving belt of the baker and after baking to be deposited on the moving belt of the cooler and cooled at room temperature or in a cooler unit before being packaged for shipment.

By means of this invention raw bagels are continuously conveyed from one unit to another disposed preferably in a linear relationship to produce a baked bagel which may further be automatically cooled for packaging. Clearly, according to this invention the bagels are prepared automatically and so without any manual aid.

The conditioner, dryer, baker and cooler are substantially of conventional chain conveyor design. However, the cooker of this invention is novel and being automatic it, for the first time, permits automatic process preparation from raw bagels to cooled packaged bagels without manual manipulation at any time.

Turning to the drawing, a longitudinal rectangular tank 10 of suitable length and width is provided with an inlet 11 for boiling hot water and also with an overflow outlet pipe 12 for return hot water.

The tank 10 is provided with a transverse inlet slot 13 at its front and with a transverse exit slot 14 at its rear and it is filled with boiling water.

A continuous metal stainless steel bagel conveyor of woven chain or articulated plates 15 is suspended between a conventional driven roller 16 and a conventional idler roller 17 with the lowest points of both of the chain lengths being suitably located below the surface 17x of the boiling water.

The bagel conveyor 15 is provided with transverse slats 18 of L-shape cross section. The slats 18 are preferably made of stainless steel as are all the other parts of this cooker.

Preferably the slats 18 are welded to the conveyor in suitable spaced apart relationship to permit capture of a bagel between adjacent slats.

The upper run of conveyor 15 is preferably supported by upper transverse support rollers 19 extending from side to side of the tank 10 to facilitate uniform movement.

An important feature of this invention is the provision of a continuous stainless steel hold-down or guide conveyor 20 over the top section of the bagel conveyor 15.

The guide conveyor 20 is preferably of screen construction and is suspended between a set of rollers 21 and 22. It may be and preferably is independently driven.

The conveyor 20 is provided with support rollers 23 to facilitate uniform movement.

Another important feature of this invention is in the configuration of the slats 18.

As shown in FIG. 2, the slats 18 are each provided with channels 24 in its outer edge 19X. These channels 24 are spaced one from another a distance to freely receive a bagel therebetween.

As shown in the drawing, a plurality of curved stationary long separator bars 25 are so located as to fall within a respective channel 24 of the moving slats 18 as the slats move near the surface 17x of the boiling water.

The curved bars 25 are each supported at their extreme ends by vertical supports 26. The supports 26 being in turn integral with transverse bars 27 fixedly disposed in the side walls of tank 10.

In the operation of the automatic bagel cooker of this invention, the conditioned or proofed bagel 28 is deposited by gravity from the protruding exit end of the conveyor belt of the proofer onto the protruding receiving end of the conveyor 15 of the cooker. Clearly, this transfer of conditioned bagels, conditioned as to temperature, moisture content, etc., is done without any manual attention.

The cooker conveyor 15 moves slowly and pushes the bagels into the furiously boiling water, said bagels being captively retained between a pair of vertically disposed adjacent bars 25, between the top moving screen conveyor 20 and the bottom bagel conveyor 15 and between a front slat 18 and the adjacent rear slat 18. Thus the floating bagel is in effect captured in a moving chamber full of boiling water.

The cooking or boiling of the bagel is for a time interval sufficient to remove the surface starch of the bagel. This time of residence in the boiling water is determined by the speed of travel of the bagel conveyor 15. The cooked bagels are removed from the water at the exit end of the tank 10 and ride over the roller 16 to fall upon the moving conveyor belt of the dryer unit.

In the automation of bagel making according to this invention each of the units, namely, the proofer, the cooker, the dryer, the baker (FIG. 3) and optionally a cooler are separate units, each having a front and rear protruding continuous conveyor therein for conveying the bagel from a prior unit and depositing at onto the conveyor of a successive unit.

The bagels are sent through the various units in a regimented manner having about 16 or so spaced apart bagels in each transverse row depending upon the width of the units used. The bagels at all times are spaced from each other in all directions so that contact of one bagel with another is always avoided.

The bagels passing from the cooker conveyor onto the dryer conveyor and those passing from the drying conveyor onto the baker hearth conveyor are deliberately flipped over one hundred eighty degrees in order to present the relatively drier top surface of the bagel from these units onto the hot conveyor belt surface of the successive dryer or baker. This flip-over procedure prevents the bagel's relatively wet surface from engaging a hot metal surface and thus it prevents sticking of the bagel to the hot metal.

The flipping of the bagel from the exit end of a conveyor is done by having the conveyor pass over a suitably positioned bull nose roller of relatively small diameter held sufficiently high above the successive receiving conveyor upon which the flipped over bagel falls.

In preparing bagels by the automated machines of this invention the formed bagels are deposited in rows onto the proofer conveyor P. The bagels are transported in the proofer in a conditioning temperature of about 90° F. to about 110° F. (dry bulb) and in a humidity of about 90° F. to 105° F. (wet bulb). The time required for conditioning or proofing is from about 45 to about 55 minutes.

The conditioned bagels are then continuously, row after row and hence regimentally transferred to the cooker conveyor C and slowly conveyed through the boiling water for a time interval of about one to one and a half minutes.

The cooked bagels are removed from the boiling water by the moving conveyor and flip transferred to the dryer conveyor P.

The bagels are dried, preferably by use of infrared heat, from suitable lamps or heating elements, to dry the up or top surface.

The top dried bagels from the dryer D are flipped over onto the baker conveyor B which preferably is a slat type conveyor, forming a smooth hearth floor. Prior to entering the baking oven the bagels are given a misty spray coating of water to make the bagel surface plastic and pliable and hence to allow for expansion without cracking during the baking step.

The baking in the baker B is preferably done in a gas fired oven having temperature controls above and below the moving conveyor hearth.

Clearly, according to this invention bagels are made automatically, or without manual handling. Where it is desired to package the bagels immediately after baking, atmosphere cooling may be replaced by use of a cooling cabinet having a conveyor therein so that the cooling of the hot baked bagels is greatly hastened.

We claim:

1. A machine for cooking bagels comprising a tank for storing boiling water; a longitudinal continuous conveyor having secured on its outer surface a plurality of upright transversely disposed spaced-apart slats, each slat having a plurality of predetermined spaced-apart channels in its top edge; roller means on each end of said conveyor disposed exteriorly of said tank suspending said conveyor in said boiling water; a plurality of spaced apart stationary arcuate bars secured to said tank at each end and disposed in the respective channels in the top edge of said slats, and a continuous guide screen having the width of said conveyor disposed adjacent to the top edge of said slats whereby bagels floating in furiously boiling water are captively moved through said water in chambers formed between the guide screen and the moving conveyor.

2. The machine of claim 1 comprising a plurality of transverse rollers disposed within and contacting said conveyor to facilitate uniform predetermined movement, and a plurality of transverse rollers disposed within said continuous guide screen to facilitate uniform predetermined movement whereby the distance between the moving screen and the moving conveyor is constant.

3. The machine of claim 2 comprising an inlet pipe for boiling water near the bottom of the tank and an overflow outlet pipe adjacent the surface of the boiling water and in suitable spaced relationship to said inlet pipe.

4. The machine of claim 3 wherein the conveyor roller protruding at the exit end is of small diameter whereby a bagel dropped by gravity therefrom flips over to fall upon its drier topside.

5. The machine of claim 4 wherein the conveyor consists of interconnected woven chain smooth plates.

References Cited

UNITED STATES PATENTS

| | | | |
|---|---|---|---|
| 1,686,596 | 10/1928 | Betz | 107—54 |
| 1,751,312 | 3/1930 | Ehrhart (I) | 107—57 |
| 1,760,979 | 6/1930 | Ferry | 99—405 |
| 1,786,485 | 12/1930 | Ehrhart (II) | 107—57 |
| 1,821,689 | 9/1931 | Broeg. | |
| 2,219,410 | 10/1940 | Bradshaw | 99—352 |
| 3,127,854 | 4/1964 | Reisman | 107—43 X |
| 3,272,154 | 9/1966 | Kratz | 107—43 X |

WALTER A. SCHEEL, *Primary Examiner.*

J. SHEA, *Assistant Examiner.*